United States Patent [19]
Yao et al.

[11] Patent Number: 6,103,378
[45] Date of Patent: Aug. 15, 2000

[54] CAPSULES HAVING DISCRETE SOLVENT/ COLOR FORMER AND DILUENT CAPSULE ENCAPSULATED PHASES

[75] Inventors: Peter C. Yao, Pickerington; Datta G. Mislankar, Chillicothe; Glenn E. Bane, Chillicothe; John K. Rourke, Chillicothe, all of Ohio

[73] Assignee: The Mead Company, Dayton, Ohio

[21] Appl. No.: 09/198,296

[22] Filed: Nov. 23, 1998

[51] Int. Cl.$^7$ .......................... B32B 15/02; B32B 17/02; B32B 19/00; B32B 21/02; B01J 13/02
[52] U.S. Cl. .................. 428/402.2; 428/402.21; 427/213.3; 427/213.34; 427/213.35; 427/213.36; 264/4.1; 264/4.33; 264/4.7
[58] Field of Search ..................... 428/402.2, 402.21; 427/213.3, 213.34, 213.35, 213.36; 264/4.1, 4.33, 4.7

[56] References Cited

U.S. PATENT DOCUMENTS

| | | |
|---|---|---|
| Re. 24,899 | 11/1960 | Green ........................... 252/316 |
| 2,730,456 | 1/1956 | Green et al. . |
| 2,800,457 | 7/1957 | Green et al. . |
| 3,432,327 | 3/1969 | Kan et al. . |
| 3,755,190 | 8/1973 | Hart et al. . |
| 3,797,669 | 3/1974 | Schacht . |
| 3,914,511 | 10/1975 | Vassiliades . |
| 4,001,140 | 1/1977 | Foris et al. . |
| 4,025,455 | 5/1977 | Shackle . |
| 4,087,376 | 5/1978 | Foris et al. . |
| 4,089,802 | 5/1978 | Foris et al. . |
| 4,137,343 | 1/1979 | Davis et al. .............. 427/150 |
| 4,170,483 | 10/1979 | Shackle et al. ............ 106/21 |
| 4,636,818 | 1/1987 | Jerabek .................... 346/213 |
| 4,684,574 | 8/1987 | Pietsch et al. . |
| 4,743,579 | 5/1988 | Fetters . |
| 5,196,287 | 3/1993 | Hammann et al. ........ 430/138 |
| 5,427,886 | 6/1995 | Miller et al. ............. 430/138 |
| 5,643,506 | 7/1997 | Rourke . |

FOREIGN PATENT DOCUMENTS

| | | |
|---|---|---|
| 0204460 | 12/1986 | European Pat. Off. . |
| 53-106210 | 9/1978 | Japan . |

OTHER PUBLICATIONS

PCT International Search Report for PCT/US99/16320, dated Nov. 5, 1999 (foreign counterpart of USSN 09/198,296).

*Primary Examiner*—Nathan M. Nutter
*Attorney, Agent, or Firm*—Thompson Hine & Flory LLP

[57] ABSTRACT

A process for producing a microencapsulated system comprising the steps of: (a) emulsifying a solution of color precursor in a solvent as a first internal phase and a diluent as a second internal phase in an external phase to produce discrete droplets of each of said first and second phases; and (b) encapsulating said droplets, is disclosed. A recording sheet is also disclosed which comprises a substrate having a layer of microcapsules containing a color precursor solution and microcapsules containing a diluent. Preferably the microcapsules are clusters of gelatin capsules.

33 Claims, 3 Drawing Sheets

CAPSULES HAVING DISCRETE SOLVENT/ COLOR FORMER AND DILUENT CAPSULE ENCAPSULATED PHASES

BACKGROUND OF THE INVENTION

The present invention relates to an improvement in microencapsulated imaging systems, and more particularly, to a method for improving image speed and intensity, while lowering cost.

Encapsulated imaging systems frequently employ diluents in conjunction with the typical color formers and solvents found in the internal phase of microcapsules. Diluents are used because they are less expensive than solvents and they enable the manufacturer to provide an imaging system having acceptable image speed and intensity at a reduced cost. However, there are limits to the amount of diluent that can be encapsulated without adversely affecting the performance of the encapsulated system. High diluent concentrations can create supersaturated solutions of the color former which are prone to crystallization or "drop out" of the color former from solution. The crystallized color former does not efficiently transfer to the co-reactive compound or sheet and, as a result, there is a corresponding decrease in the speed of image development and overall image intensity.

One proposed solution to this problem is disclosed in U.S. Pat. No. 4,684,574 (Pietsch et al.). This patent discloses the precise metering of the two components (color former solution and diluent) into an in-line mixer just prior to emulsification. The basic underlying concept is that by immediately emulsifying the mixture after adding the diluent there is not sufficient time for the color former to crystallize out of solution before emulsification and encapsulation. The resulting microcapsules are claimed to be comparable to those prepared with pure solvent. However, it has been found that crystallization can still occur in microcapsules prepared by this method. At high enough levels of diluent, the color former can crystallize out either in the mixing chamber or in the encapsulated product.

U.S. Pat. No. 4,636,818 to Jerabek discloses a carbonless copying system including two types of microcapsules. The first type of microcapsule contains either a solution or suspension of one of the two mark forming components of the carbonless system. The second type of microcapsule encapsulates only solvent. The solvent-only microcapsules disclosed in Jerabek enhance imaging capability without an increase in usage of dye precursors. However, the additional solvent usage increases the cost of the microcapsules. It would be desirable to achieve the same effect with less expensive diluent.

Accordingly, it is desirable to provide an imaging system wherein a high concentration of diluent can be incorporated into a microencapsulated imaging system to improve speed of image development and image intensity.

SUMMARY OF THE INVENTION

The present invention provides a microcapsule composition comprising first and second microcapsules wherein the first microcapsules contain a solution of a color precursor and a solvent and the second microcapsules contain a diluent. It should be understood that small but functionally insignificant amounts of diluent may be incorporated into the color precursor and solvent containing microcapsules and small amounts of solvent and/or colorformers may be incorporated into the diluent containing microcapsules without departing from the invention. The microcapsule walls are selected to minimize smudge and permeability. The first and second microcapsules can be prepared using the same or different wall formers using integrated or independent encapsulation processes. In a particular embodiment of the invention the first and second microcapsules are gelatin microcapsule clusters as described below. The present invention also provides a recording sheet in which a paper or film substrate is coated with a layer of the aforementioned microcapsule composition.

The present invention provides a method for producing a microencapsulated system with improved imaging capabilities. The method comprises the steps of: a) providing a solution of a color precursor in a solvent as a first internal phase; b) providing a diluent as a second internal phase; c) providing an external phase; d) emulsifying said first and second internal phases in said external phase to produce discrete droplets of each of said first and second internal phases; and e) encapsulating said droplets in a wall former. In one embodiment of the invention the first internal phase containing the mark-forming component in solvent is first emulsified, followed by emulsification of the second phase containing only diluent. The emulsions are then encapsulated to form capsules with discrete color former/solvent and diluent droplets. Alternatively, the first and second phases can be emulsified separately and then combined. The two droplet types can then be encapsulated as described above. As a further alternative the color precursor solution and the diluent can be microencapsulated separately and then mixed. Emulsification can be accomplished either by the continuous, in-line method or by the re-circulating, batch method in a manner known in the art.

In accordance with a preferred embodiment of the invention, polynuclear gelatin capsule clusters of color former solution containing and diluent containing microcapsules are formed. Reference to clusters of microcapsules, as described herein, is meant to describe not only microcapsules formed around a group of color precursor solution containing and diluent containing microcapsules but also microcapsules formed around groups of discrete droplets of color precursor solution and diluent. Both types of clusters are within the scope of the present invention. The formation of capsule clusters depends on the wall forming material and the encapsulation conditions. Non-gelatin capsules are not typically clustered. In this case the diluent capsules and the color precursor solution capsules are usually mixed without actually being bound together as a cluster.

Providing the diluent in a separate capsule or in a separate chamber of a capsule cluster from the color precursor solution can provide several advantages. It provides the benefits associated with using a diluent, such as, lower cost and improved speed of development, but avoids a supersaturated condition that results in crystallization or kick out of the color former. The diluent and color former/solvent instantaneously mix when the capsules are subjected to an imaging force, transfer to the CF sheet and create an image upon reaction with the co-reactant. The presence of the diluent improves mass transfer generating a quicker, more intense image. The diluent also wets out the CF surface making it more receptive for image development. It also enables one to use more concentrated color former solutions than are typically used in manufacturing. By separately encapsulating the diluent, the color precursor is not likely to crystallize or precipitate during encapsulation. This improves encapsulation because crystallization of the color precursor can result in a more permeable capsule.

DETAILED DESCRIPTION OF THE INVENTION

In accordance with the present invention, an improved encapsulated composition generating an image that is faster developing and more intense is produced by providing for discrete color former/solvent and diluent encapsulated phases. To produce the encapsulated composition, two internal phase solutions and one external phase solution are used and the interrelationship of these three phases is shown in FIG. 1 for one embodiment of the invention.

Figure 1:
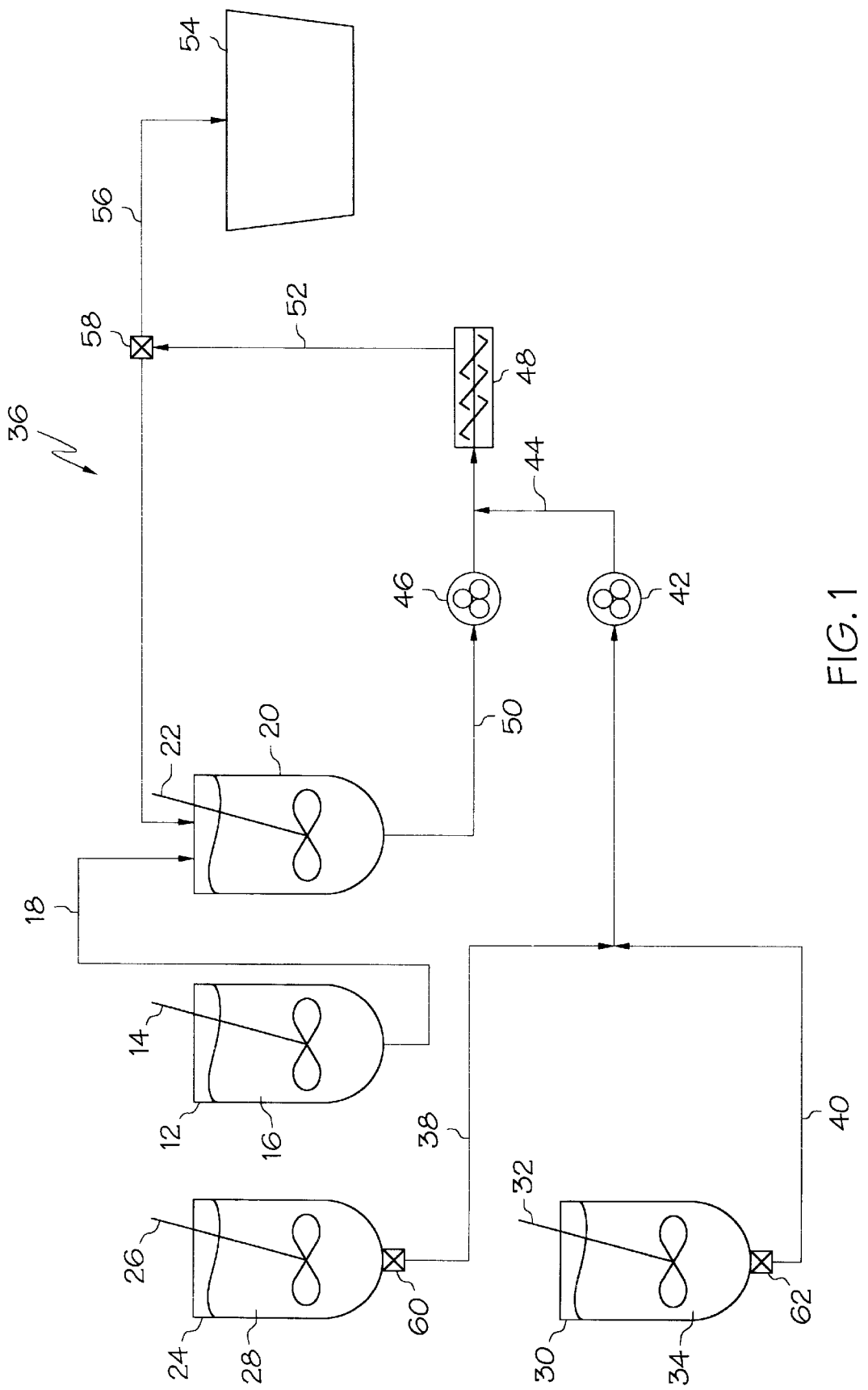
FIG. 1 is a schematic diagram of the system embodying the teachings of the instant invention.

As shown in FIG. 1, tank 12 having stirrer 14 contains external phase 16. External phase 16 typically contains an aqueous solution of gelatin and gum arabic. In communication with tank 12 through pipe 18 is recirculating tank 20 having stirrer 22. Tank 24 having stirrer 26 contains first internal phase 28, typically a solution of color former in solvent. Tank 30 having stirrer 32 contains second internal phase 34, typically a diluent. Tanks 24 and 30 are in communication with recirculating system 36 through pipes 38 and 40 respectively, and metering pump 42 and pipe 44. Recirculating system 36 consists of recirculating tank 20, metering pump 46, emulsifier 48 and pipes 50 and 52. Recirculating system 36 is in communication with reactor 54 through pipe 56 connected to T-valve 58.

To produce microcapsules according to the present invention, tank 12 is filled with external phase 16, tank 24 is filled with first internal phase 28 and tank 30 is filled with second internal phase 34. External phase 16 is pumped through pipe 18 to recirculating tank 20. Recirculating metering pump 46 and emulsifier 48 are switched on to recirculate external phase 16 through recirculating system 36. Emulsifier 48 is set to low shear or low RPM to avoid producing an emulsion in which the particle size is too small until both internal phases have been added. First internal phase 28 is added next by opening valve 60 and turning on metering pump 42. First internal phase 28 passes through pipes 38 and 44 to enter recirculating system 36. Second internal phase 34 is then added by closing valve 60 and opening valve 62. Second internal phase 34 passes through pipes 40 and 44 to enter recirculating system 36. Alternatively, the order of addition for the internal phase solutions could be reversed. Second internal phase 34 could be emulsified first, followed by emulsification of first internal phase 28.

After adding all components to recirculating system 36, the speed of emulsifier 48 is increased until the desired emulsion size is reached. The emulsion containing discrete droplets of each internal phase is then pumped through pipe 56 to reactor 54 for clustering and encapsulation.

Figure 2:
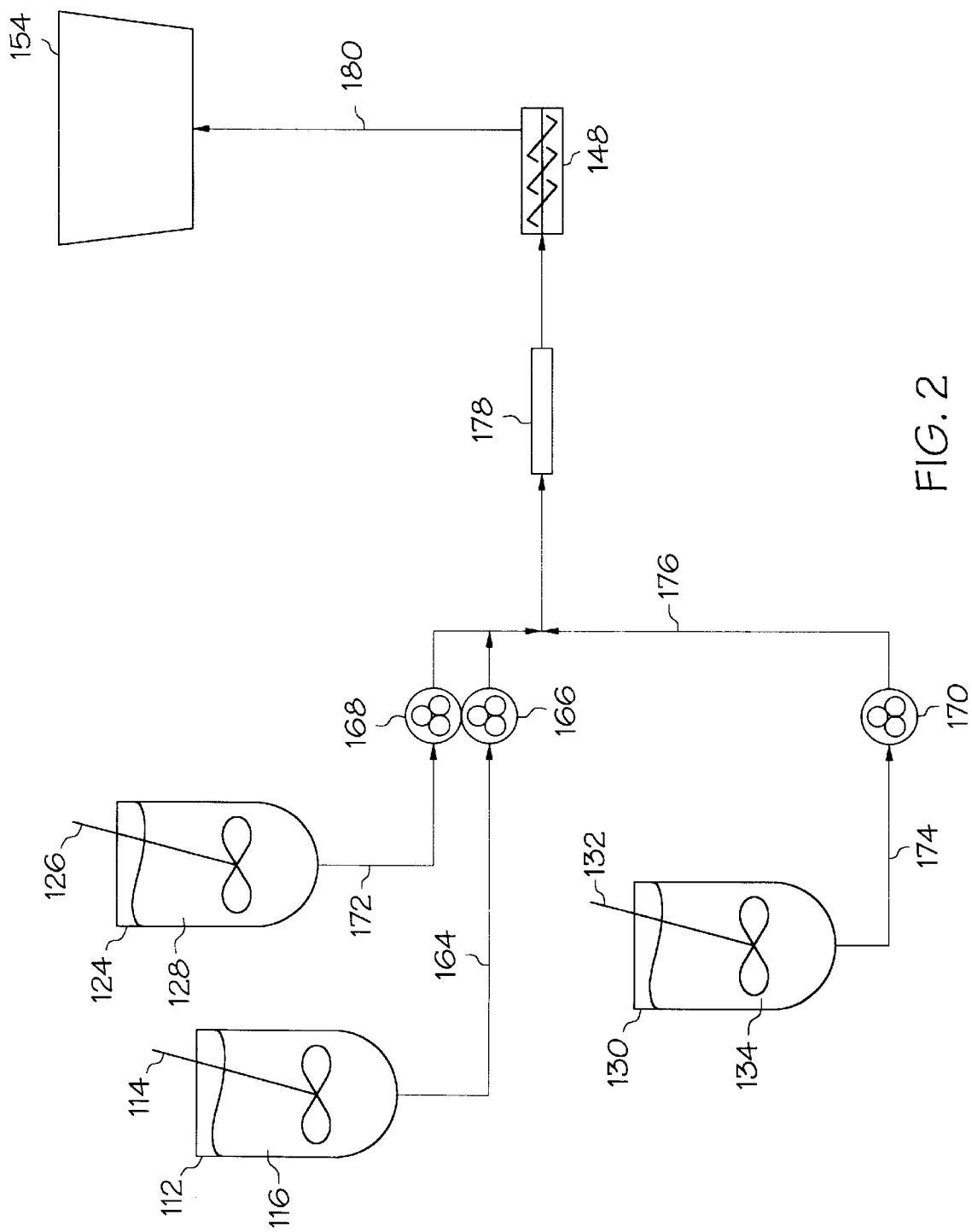
FIG. 2 is a schematic diagram of an alternative system embodying the teachings of the instant invention.

Alternatively, the process described in connection with FIG. 1 may be conducted on a continuous basis. As shown in FIG. 2, tank 112 having stirrer 114 contains external phase 116. In communication with tank 112 through pipe 164 is metering pump 166. Tank 124 having stirrer 126 contains first internal phase 128, typically a solution of color former in solvent. Tank 130 having stirrer 132 contains second internal phase 134, typically a diluent. Tanks 124 and 130 are in communication with metering pumps 168 and 170 through pipes 172 and 174, respectively. Metering pumps 166, 168 and 170 feed material to common pipe 176 connected to pre-mixer 178. Pre-mixer 178 discharges material into emulsifier 148 which is in communication with reactor 154 through pipe 180.

To produce microcapsules according to this embodiment of the present invention, tank 112 is filled with external phase 116, tank 124 is filled with first internal phase 128 and tank 130 is filled with second internal phase 134. Metering pumps 168 and 166 are set to deliver a predetermined flow of material of first internal phase 128 and external phase 116 into common pipe 176. This pre-emulsion mix of first internal phase and external phase is then passed through pre-mixer 178 into emulsifier 148 and finally delivered to reactor 154. After first internal phase 128 is consumed, metering pump 168 is switched off and metering pump 170 is turned on and set to deliver a predetermined flow of second internal phase 134 into common pipe 176. Metering pump 166 remains on and may be adjusted to deliver the appropriate amount of external phase 116 to correspond to the amount of second internal phase 134 being processed. This pre-emulsion mix of second internal phase and external phase is then passed through pre-mixer 178 into emulsifier 148 and finally delivered to reactor 154. The emulsion undergoes clustering and encapsulation in reactor 154.

Figure 3:
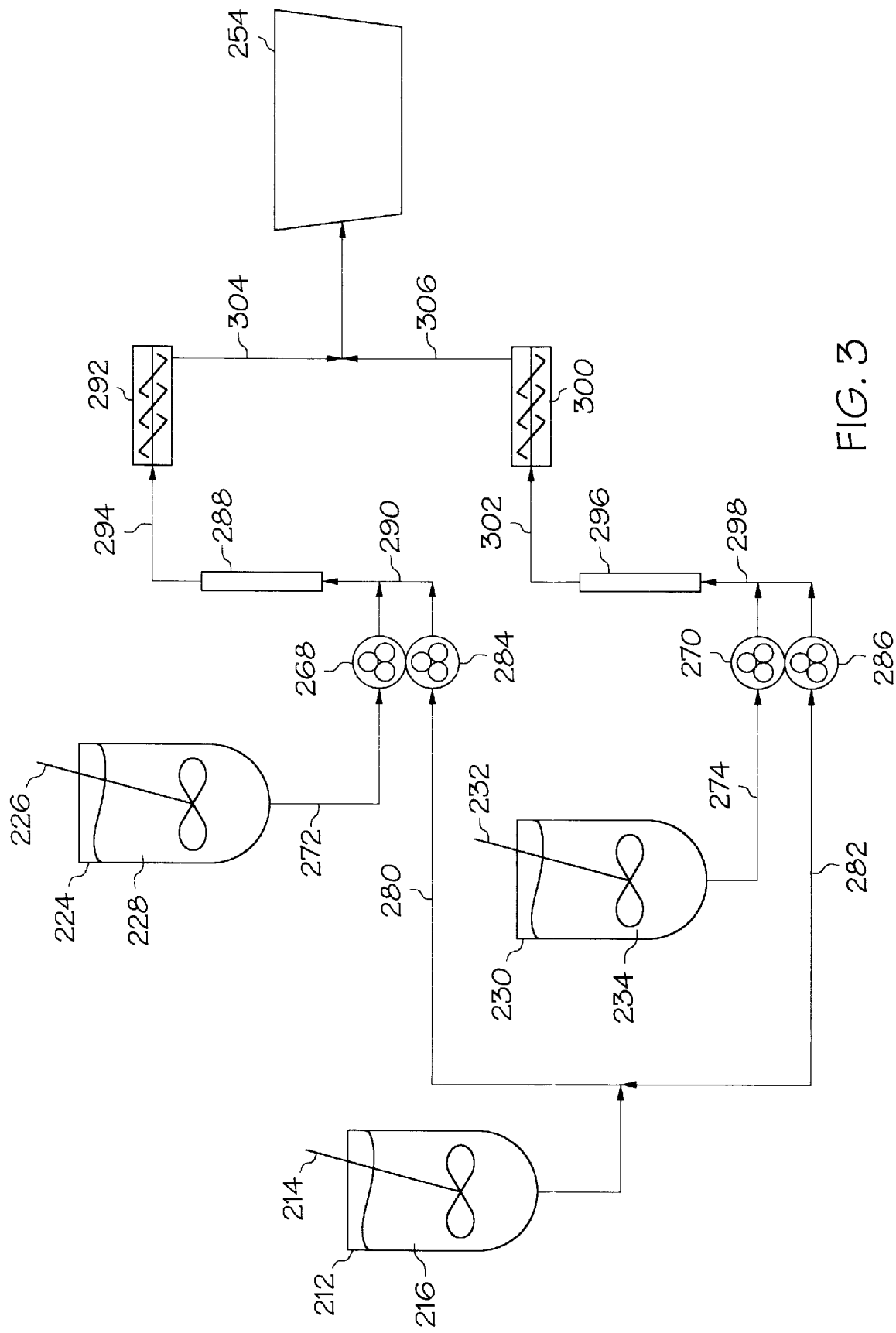
FIG. 3 is a schematic diagram of another system embodying the teachings of the instant invention.

In another embodiment, as shown in FIG. 3, the emulsification of the two internal phases may be conducted by a parallel emulsification method. In this embodiment, tank 212 having stirrer 214 contains external phase 216. In communication with tank 212 through pipes 280 and 282 are metering pumps 284 and 286, respectively. Tank 224 having stirrer 226 contains first internal phase 228 and is in communication with metering pump 268 through pipe 272. Tank 230 having stirrer 232 contains second internal phase 234 and is in communication with metering pump 270 through pipe 274. Metering pumps 268 and 284 are connected to premixer 288 through pipe 290. Premixer 288 feeds material into emulsifier 292 through pipe 294. Likewise, metering pumps 270 and 286 are connected to premixer 296 through pipe 298. Premixer 296 feeds material into emulsifier 300 through pipe 302. Emulsifiers 292 and 300 are in communication with reactor 254 through pipes 304 and 306, respectively.

To produce microcapsules according to this embodiment of the present invention, tank 212 is filled with external phase 216, tank 224 is filled with first internal phase 228 and tank 230 is filled with second internal phase 234. Metering pumps 284 and 286 are set to deliver a predetermined flow of external phase 216 from tank 212 to pipes 290 and 298, respectively. Metering pumps 268 and 270 are set to deliver a predetermined flow of first internal phase 228 from tank 224 and second internal phase 234 from tank 230 to pipes 290 and 298, respectively. The pre-emulsion mix of first internal phase and external phase is then passed through pre-mixer 288 into emulsifier 292 and finally delivered to reactor 254. Simultaneously, the pre-emulsion mix of second internal phase and external phase is passed through pre-mixer 296 into emulsifier 300 and delivered to reactor 254. The emulsion undergoes clustering and encapsulation in reactor 254.

While not diagramed, the color precursor microcapsules can also be prepared independently of the diluent microcapsules and the two microcapsules can be mixed to form a coating composition which can be applied to a substrate to prepare a recording sheet in a conventional manner.

The solvents used in the present invention include those conventionally used in microencapsulated imaging systems. Reference to "solvents" within the scope of the invention indicates those solvents capable of dissolving the color precursor to yield a satisfactorily concentrated and encapsulatable solution. Representative examples of such solvents include aromatic solvents and chlorinated hydrocarbons. The aromatic solvents more particularly include benzyl butyl phthalate, dibutyl phthalate, toluene, various xylenes, alkyl benzenes, alkyl naphthalenes, alkyl biphenyls and mixtures thereof. Chlorinated hydrocarbons include chlorinated paraffins and chlorinated alpha-olefms (see U.S. Pat. No. 4,743,579 to Fetters). A particularly useful solvent is Nisseki SAS-310.

The diluents used in the present invention include any of a number of non-solvents in which the color precursors are not soluble to a significant degree that have been employed as diluents in the carbonless paper industry. Diluents are typically non-aromatic and relatively inexpensive compared to solvents. Diluents more particularly include aliphatic and cycloaliphatic compounds. Particularly useful in the present invention are aliphatic and cycloaliphatic petroleum constituents, including those present in the second main fraction of petroleum undergoing fractional distillation, containing paraffin hydrocarbons with 9 to approximately 20 carbon atoms, namely raw gasoline or its partial fractions in the form of petroleum ether, light gasoline, ligroin, heavy naphtha, kerosene, etc. Gas oil compounds as the third main fraction of the distillation and formed from paraffins with 12 to 19 carbon atoms are also useful. Natural gasoline is also suitable and represents the gasoline gas fractions present in natural gas and is removed from the latter by compression or absorption in oil.

Petroleums formed from up to 80% from cyclic hydrocarbons (naphthenes) can also be used. Naphthene fractions can also be advantageously used for the present invention. Particularly useful are cyclopentane, cyclohexane and their alkyl derivatives. Furthermore, it is possible to use petroleum fractions which occupy a middle position between "paraffinic" and "naphthenic" petroleums. Specific examples of inexpensive, non-aromatic chemicals useful as diluents in the present invention include Exxsol D110, Exxsol D 100, Exxsol D 80, Exxsol D 180/210, Exxsol D 140–170, Isopar L, Isopar M, Shellsol TD, Shellsol K, and Flavex oil 909.

The color precursors used in the present invention include those chromogenic materials which have previously been taught for use in microencapsulated imaging systems. In general, these materials are colorless electron donating type dry precursor compounds which react with a developer compound to generate a dye. Representative examples of such color formers include substantially colorless compounds having in their partial skeleton a lactone, a lactam, a sultone, a spiropyran, an ester or an amido structure. Specifically, there are triarylmethane compounds, bisphenylmethane compounds, xanthene compounds, thiazine compounds, spiropyran compounds and the like. Typical examples of them include Crystal Violet lactone, benzoyl leuco methylene blue, Malachite Green Lactone, p-nitrobenzoyl leuco methylene blue, 3-dialkylamino-7-dialkylamino-fluoran, 3-methyl-2,2'-spirobi(benzo-f-chrome), 3,3-bis(p-dimethylaminophenyl)phthalide, 3-(p-dimethylaminophenyl)-3-(1,2dimethylindole-3-yl) phthalide, 3-(p-dimethylaminophenyl)-3-(2-methylindole-3-yl)phthalide, 3-(p-dimethylaminophenyl)-3-(2-phenylindole-3-yl)phthalide, 3,3-bis(1,2-dimethylindole-3-yl)-5-dimethylaminophthalide, 3,3-bis-(1,2-dimethylindole-3-yl)6-dimethylaminophthalide, 3,3-bis-(9-ethylcarbazole-3-yl)-5-dimethylaminophthalide, 3,3-bix(2-phenylindole-3-yl)-5-dimethylaminophthalide, 3-p-dimethylaminophenyl-3-(1-methyl pyrrole-2-yl)-6-dimethylaminophthalide, 4,4'-bis-dimethylaminobenzhydrin benzyl ether, N-halophenyl leuco Auramine, N-2,4,5-trichlorophenyl leuco Auramine, Rhodamine-B-anilinolactam, Thodamine-(p-nitroanilino) lactam, Rhodamine-B-(p-chloroanilino)lactam, 3-dimethylamino-6-methoxyfluoran, 3-diethylamino-7-methoxyfluoran, 3-diethylamino-7-chloro-6-methylfluoroan, 3-diethylamino-6-methyl-7-anilinofluoran, 3-diethylamino-7-(acetylmethylamino)fluoran, 3-diethylamino-7-(dibenzylamino)fluoran, 3-diethylamino-7-(methylbenzylamino)fluoran, 3-diethylamino-7-(chloroethylmethylamino)fluoran, 3-diethylamino-7-(diethylamino)fluoran, 3-methyl-spiro-dinaphthopyran, 3,3'-dichloro-spiro-dinaphthopyran, 3-benzyl-spiro-dinaphthopyran, 3-methyl-naphtho-(3-methoxybenzo)-spiropyran, 3-propyl-spirodibenzoidipyran, etc. Mixtures of these color precursors can be used if desired. Also useful in the present invention are the fluoran color formers disclosed in U.S. Pat. No. 3,920,510, which is incorporated by reference. In addition, organic compounds capable of reacting with heavy metal salts to give colored metal complexes, chelates or salts can be adapted for use in the present invention.

In accordance with the invention, the color former is incorporated in the first internal phase in an amount sufficient to produce a visible image of the desired density upon reaction with the developer. In general, these amounts range from approximately 0.5 to about 20.0 percent based on the weight of the first internal phase solution containing the chromogen. A preferred range is from about 5 percent to about 20 percent, with a more preferred range being from about 10 percent to about 20 percent. The amount of the chromogenic material required to obtain suitable images depends on the nature of the chromogen, the nature of the internal phase, and the type of imaging system. Higher concentrations of chromogenic materials are possible with the present invention than with typical microencapsulated imaging systems. Concentrations of chromogenic materials that would tend to crystallize out of an internal phase solution based on a solvent/diluent mixture can be formed in a stable manner with the discrete solvent/color former and diluent capsule encapsulated phases of the present invention.

Wall-forming materials which may be useful in the present invention include gelatin (see U.S. Pat. No. 2,730, 456 and 2,800,457 to Green et al) including gum arabic, polyvinyl alcohol, carboxymethyl cellulose; resorcinol-formaldehyde (see U.S. Pat. No. 3,755,190 to Hart et al), isocyanate (see U.S. Pat. No. 3,914,511 to Vassiliades), polyurethane (see U.S. Pat. No. 3,796,669 to Kiritani et al), ureaformaldehyde wall-formers and more particularly urea-resorcinol-formaldehyde wall formers (in which oleophilicity is enhanced by the addition of resorcinol) (see U.S. Pat. Nos. 4,001,140; 4,087,376 and 4,089,802 to Foris et al) melamine-formaldehyde resin, hydroxypropyl cellulose (see U.S. Pat. No. 4,025,455 to Shackle) and polyurea (U.S. Pat. No. 5,643,506 to Rourke). Other wall formers are described in U.S. Pat. No. 3,432,327 to Kan et al. Microencapsulation has been accomplished by a variety of known techniques including coacervation, interfacial polymerization, polymerization of one or more monomers in an oil, as well as various melting, dispersing and cooling methods. The choice of wall-forming material depends on the diluent to be encapsulated. Permeability of the diluent through the capsule wall material must be relatively low. In other words, the capsule must be capable of containing the diluent without excessive leakage or exudation through the capsule wall. Furthermore, the wall-material and diluent combination must be selected to optimize smudge characteristics. The diluent capsules, as well as the color former/solvent capsules, must be able to withstand normal handling and processing forces without rupturing. Premature release of encapsulated components results in undesirable blushing or smudge as well as deleteriously impacting final image intensity.

The mean size of the capsules used in the present invention may vary over a broad range but generally ranges from approximately 1 to 25 microns. As a general rule, image resolution improves as the capsule size decreases with the caveat that if the capsule size is too small, the capsule may sit within incongruities in the support and the support may screen the capsules from exposure. Very small capsules may also fail to rupture upon the application of pressure. In view of the foregoing, it has been found that a preferred mean capsule size range is approximately 3 to 15 microns and particularly approximately 5 to 12 microns.

The ratio of solvent and diluent should be optimized to achieve the best combination of cost, intensity, images speed, smudge, and permeability. While the invention has been described with references to a first internal phase containing a solvent and a color former, those skilled in the art will recognize that the benefits of the invention could still be obtained to some degree even if some amount of diluent is included in the first internal phase. It has been found that the first internal phase can be modified to include up to 30% by weight diluent based on the combined amount by weight of the solvent and diluent.

The microcapsules of the present invention can be used in a variety of image forming systems. Image formation can be initiated by application of pressure, as with typical carbonless paper, or by application of heat, as with heat sensitive recording paper. The microcapsules can be incorporated into a press applied hot melt coating dispersion for use in producing pressure sensitive carbonless transfer sheets as described in U.S. Pat. No. 4,137,343 incorporated herein by reference.

In a typical carbonless system, the microcapsule slurry containing solvent/color former is compounded into a coating capable of being transferred to a substrate. Of course, with respect to the present invention the slurry will also contain the diluent capsules. This coating is referred to as the CB coating and the substrate carrying the coating is the CB sheet. The CB coating is applied to the back surface of the top ply in a form set. Image formation is achieved by mating the CB coating with a CF coating containing a co-reactant such as a phenolic resin, acid activated clay or a salicylic acid derivative which reacts with the color former to generate an image. The CF (coated front) coating is typically applied to the top surface of the sheet adjacent to the CB coating in the formset. Sheets which contain both CB and CF coatings are referred to as CFB sheets and are typically used as the intermediate plies in a formset. The CFB has a top coated CF surface for reacting with the CB from the adjacent top sheet and a back coated CB surface for reacting with the CF on the adjacent bottom sheet of the formset. An image generating force, typically pressure, is applied to the formset causing the CB microcapsules to rupture and release the encapsulated contents to the surface of the CF sheet where the color forming reaction occurs. The components of the CB and CF coatings can also be applied to the same surface of a sheet to yield a self contained sheet. An image can be formed on a self contained sheet by simply applying an imaging force; a mating sheet is not required. Those skilled in the art will recognize that other practices conventionally used in the manufacture of recording sheets are also useful in practicing this invention.

The invention is illustrated in more detail by the following non-limiting examples:

EXAMPLES 1–10

Microcapsules were prepared in accordance with the present invention and compared to microcapsules prepared using a single internal phase containing both solvent and diluent. Capsules were prepared using both blue and black image dye combinations. Exxsol D 110 was used as the diluent and Nisseki SAS-310 was used as the solvent. Each microcapsule formulation was made up into a coating composition by adding stilting agent and binder. The finished CB coating compositions were coated at 1.3±0.5 #/ream using laboratory drawdown equipment. The coated sheets were imaged and tested for speed of image development. Image intensity was measured at various points in time with a reflectance meter. The lower the reflectance number, the better or more intense the image.

The speed of image development results for Examples 1–10 are shown below. Examples 1–4 represent control samples for black image CB prepared according to prior art methods wherein the solvent and diluent are admixed along with the color precursors in a single internal phase solution. The ratio of solvent to diluent is limited because of the limited solubility of the dye precursors in the diluent. Examples 5 and 6 represent samples prepared in accordance with the present invention. The use of two internal phases and the creation of two discrete types of droplets allows for increasing levels of diluent without compromising speed of image development. Although, the diluent level in samples 5 and 6 was increased to 40%, the results for speed of image development and final intensity are comparable to those obtained with the control samples at lower concentrations of diluent.

Likewise, samples 7 and 8 represent blue image CB control samples and samples 9 and 10 represent samples prepared in accordance with the present invention. Again, the use of discrete droplets containing only diluent has allowed the use of higher levels of diluent without a decrease in performance.

| Example | Image Color | Discrete diluent droplets? | Solvent/ diluent | Image speed (intensity) Time (minutes) | | | | |
| --- | --- | --- | --- | --- | --- | --- | --- | --- |
| | | | | 0.5 | 1 | 2 | 5 | 10 |
| 1 | Black | No | 75/25 | 64.71 | 58.03 | 53.52 | 50.15 | 49.31 |
| 2 | Black | No | 75/25 | 58.11 | 52.09 | 49.32 | 46.94 | 45.58 |
| 3 | Black | No | 70/30 | 66.24 | 58.58 | 53.97 | 51.17 | 49.62 |
| 4 | Black | No | 70/30 | 63.82 | 55.50 | 52.67 | 49.65 | 48.86 |
| 5 | Black | Yes | 60/40 | 63.50 | 55.93 | 52.18 | 49.65 | 48.84 |
| 6 | Black | Yes | 60/40 | 64.43 | 57.25 | 53.71 | 51.83 | 50.96 |
| 7 | Blue | No | 70/30 | 52.43 | 46.65 | 43.35 | 41.93 | 40.52 |
| 8 | Blue | No | 70/30 | 49.58 | 44.53 | 41.72 | 40.53 | 39.60 |
| 9 | Blue | Yes | 60/40 | 51.70 | 45.10 | 41.85 | 39.99 | 38.51 |
| 10 | Blue | Yes | 60/40 | 49.92 | 45.93 | 43.38 | 41.67 | 42.22 |

Having described the invention in detail and by reference to preferred embodiments thereof, it will be apparent that modifications and variations are possible without departing from the scope of the invention defined in the appended claims.

What is claimed is:

1. A process for producing a dispersion of microcapsules comprising the steps of:

(a) emulsifying a first and a second internal phase in an external phase to produce discrete droplets of each of said first and second internal phases; and (b) encapsulating said droplets in a capsule wall former wherein said first internal phase is a solution of a color former in a solvent and said second internal phase is a diluent.

2. The process of claim 1 wherein said step of encapsulating said droplets is conducted such that microcapsules containing a cluster of encapsulated droplets of said first and said second internal phase are formed.

3. The process of claim 1 wherein said color former is selected from the group consisting of lactone derivatives, fluoran derivatives, phthalide derivatives, diphenylmethane derivatives, triphenylmethane derivatives, spiropyran derivatives and mixtures thereof.

4. The process of claim 1 wherein said diluent is selected from the group consisting of aliphatic hydrocarbon solvents, cycloaliphatic hydrocarbon solvents and mixtures thereof.

5. The process of claim 2 wherein said external phase is an aqueous solution of gelatin and gum arabic and said wall former is gelatin.

6. The process of claim 1 wherein said first and second internal phases are emulsified sequentially in said external phase to produce said discrete droplets.

7. The process of claim 6 wherein said discrete droplets are further emulsified as a batch to a desired emulsion size.

8. The process of claim 6 wherein said discrete droplets are emulsified inline to a desired emulsion size.

9. The process of claim 1 wherein said first and second internal phases are simultaneously emulsified in said external phase.

10. The process of claim 5, wherein the concentration of said color former in said solution is approximately 0.5 to 20%.

11. The process of claim 10 wherein said concentration is about 10 to 20%.

12. The process of claim 1 wherein said wall former is a polyurea, a polyurethane or a melamine-formaldehyde resin.

13. A coating composition containing microcapsules prepared by the process of claim 1.

14. A recording sheet comprising a substrate and a layer of microcapsules on the surface of said substrate, said microcapsules including a plurality of first microcapsules and a plurality of second microcapsules; said first microcapsules encapsulating a solution of colorformer and a solvent; and said second microcapsules encapsulating a diluent.

15. The recording sheet of claim 14 wherein said color former is selected from the group consisting of lactone derivatives, fluoran derivatives, phthalide derivatives, diphenylmethane derivatives, triphenylmethane derivatives, spiropyran derivatives and mixtures thereof.

16. The recording sheet of claim 15 wherein said diluent is selected from the group consisting of aliphatic hydrocarbon solvents, cycloaliphatic hydrocarbon solvents and mixtures thereof.

17. The recording sheet of claim 16 wherein the concentration of said color former in said solution is about 0.5 to 20%.

18. The recording sheet of claim 17 wherein said microcapsules are clusters of gelatin capsules containing a solution of said color precursor and gelatin capsules containing diluent.

19. The recording sheet of claim 17 wherein said microcapsules are formed from polyurethane, a polyurea or a melamine-formaldehyde wall former.

20. A microcapsule composition comprising first and second microcapsules wherein said first microcapsules contain a solution of a color precursor and a solvent and said second microcapsules contain a diluent.

21. A method comprising:
(a) providing a solution of a color precursor in a solvent as a first internal phase;
(b) providing a diluent as a second internal phase;
(c) providing an external phase;
(d) emulsifying said first and second internal phases in said external phase to produce discrete droplets of each of said first and second internal phases; and
(e) encapsulating said droplets in a wall former.

22. The process of claim 21 wherein said step of encapsulating said droplets is conducted such that microcapsules containing a cluster of encapsulated droplets of said first and said second internal phase are formed.

23. The process of claim 21 wherein said diluent is selected from the group consisting of aliphatic hydrocarbon solvents, cycloaliphatic hydrocarbon solvents and mixtures thereof.

24. The process of claim 22 wherein said external phase is an aqueous solution of gelatin and gum arabic and said wall former is gelatin.

25. The process of claim 24 wherein the concentration of said color former in said solution is approximately 0.5 to 20%.

26. The process of claim 25 wherein said concentration is about 10 to 20%.

27. The process of claim 21 wherein said wall former is a polyurea, a polyurethane or a melamine-formaldehyde resin.

28. A recording sheet comprising a substrate having a layer of microcapsules on the surface, said microcapsules being clusters of first and second gelatin capsules, said first capsules being capsules containing a solution of a color former and a solvent and said second capsules being capsules containing a diluent.

29. The recording sheet of claim 28 wherein said diluent is selected from the group consisting of aliphatic hydrocarbon solvents, cycloaliphatic hydrocarbon solvents and mixtures thereof.

30. The recording sheet of claim 29 wherein the concentration of said color former in said solution is about 0.5 to 20%.

31. The recording sheet of claim 30 wherein said concentration is about 10 to 20%.

32. The recording sheet of claim 31 wherein said microcapsules are clusters of gelatin capsules containing a solution of said color precursor and gelatin capsules containing diluent.

33. The recording sheet of claim 31 wherein said microcapsules are formed from a polyurethane, a polyurea or a melamine-formaldehyde wall former.

* * * * *